J. A. Topliff & G. H. Ely.
Velocipede.
N° 87,225.   Patented Feb. 23, 1869.

Witnesses
A. Bennenendorf
Wm. A. Morgan

Inventors
J. A. Topliff
G. H. Ely
per
Mmm
Attorneys

United States Patent Office.

JOHN A. TOPLIFF AND GEORGE H. ELY, OF ELYRIA, OHIO.

Letters Patent No. 87,225, dated February 23, 1869.

---

IMPROVEMENT IN VELOCIPEDES.

---

The Schedule referred to in these Letters Patent and making part of the same.

---

*To all whom it may concern:*

Be it known that we, JOHN A. TOPLIFF and GEORGE H. ELY, of Elyria, in the county of Lorain, and State of Ohio, have invented a new and improved Velocipede; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
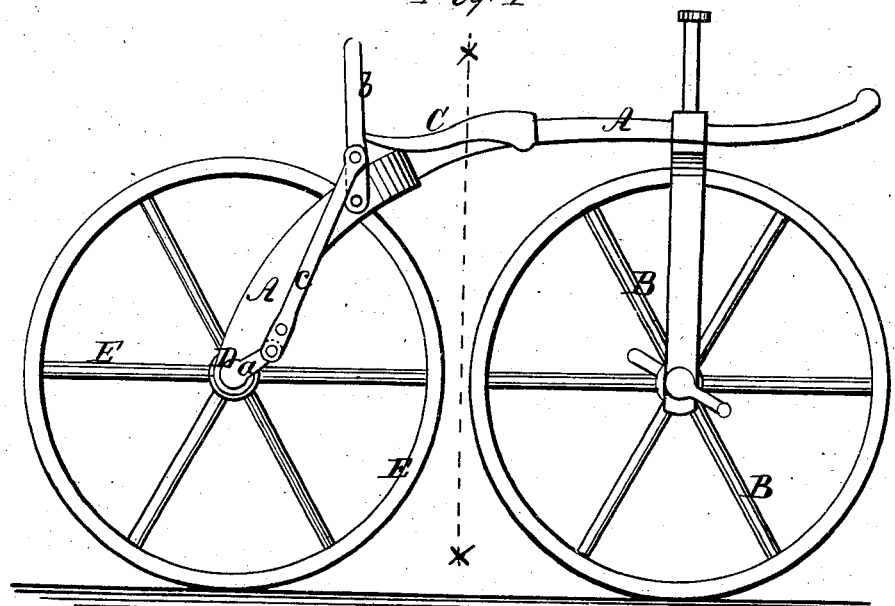
Figure 1 represents a side elevation of our improved velocipede.

The object of this invention is to so construct a velocipede, that it may instantaneously be transformed into a two or three-wheeled vehicle, as the rider may desire, and while in motion.

The invention consists in providing a rear axle, which is bent, so as to be somewhat V-shaped, and in loosely hanging a wheel on each one of its inclined ends.

When the axle is turned by suitable leverage, provided for that purpose, so that its middle part is higher than its ends, the wheels will be both in the middle, and its tires will come together, so that the two rear wheels will constitute but one single wheel, making the velocipede a two-wheeled one, or at least one that possesses all the advantages of a two-wheeled velocipede.

When the position of the axle is reversed, the wheels will be on its ends, and the velocipede will consequently be three-wheeled.

The operator may, with our improved instrument, cause the rear wheels to be apart while he is learning, and when he gets into the seat. When under way, he may at any time turn the rear axle to bring the rear wheels together, in order to ride on a two-wheeled velocipede.

A, in the drawing, represents the reach of a velocipede.

B is the front wheel.

C, the seat.

All these parts and their respective appendages are of suitable construction.

Figure 2:
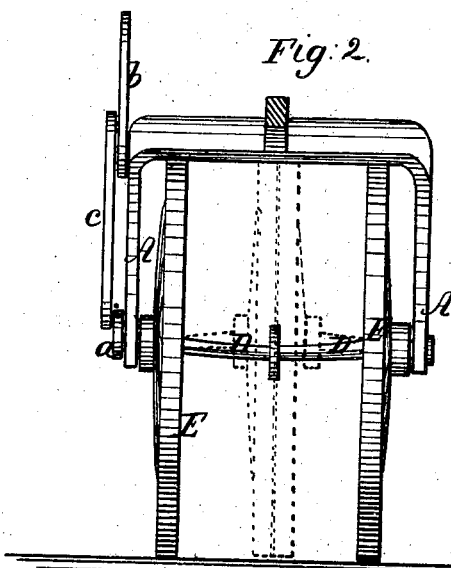
Figure 2 is a vertical transverse section of the same, taken on the plane of the line $x$ $x$, fig. 1, and looking toward the rear axle.

D is the rear axle. It is, with its ends, supported in the rear ends of the bifurcated reach, and is bent into the shape of a flat letter V, as shown in fig. 2. In its middle, is arranged on it, a stop, or disk, $a$, to prevent the wheels from crowding each other.

A wheel, E, is hung loose on each end of the axle D, as shown.

A crank, $b$, is mounted on one end of the axle D, and is connected with suitable levers F, so that by their means, the said axle can conveniently be turned half around.

When the axle is so set that its middle part is higher than the ends, as shown by red lines in fig. 2, the weight of the rider and frame will cause the wheels to slide toward the middle of the axle, as shown by red lines.

When, however, the axle is turned half around, to cause its ends to be higher than the middle, the wheels will slide toward the ends, as shown by black lines in fig. 2.

The system of levers $b$ may be of any suitable construction, and we do not confine ourselves to any particular number or form of them, although the lever $b$ and connecting-rod $c$ will answer well, to set the axle D, and to retain it in any desired position.

We claim as new, and desire to secure by Letters Patent—

1. The V-shaped rear axle D, carrying the two wheels E E, substantially as described, for the purpose of having the wheels readily moved apart or together, as set forth.

2. Connecting the crank of the V-shaped rear axle D with the lever or levers $b$, so that it may be swung to separate or bring together the wheels E E, substantially as herein shown and described.

JOHN A. TOPLIFF.
GEO. H. ELY.

Witnesses:
S. B. SMITH,
HEMAN ELY.